United States Patent [19]

Sugano

[11] Patent Number: 4,607,731
[45] Date of Patent: Aug. 26, 1986

[54] HYDRAULIC CONTROL SYSTEM FOR AUTOMATIC TRANSMISSION HAVING TORQUE CONVERTER WITH LOCK-UP MECHANISM

[75] Inventor: Kazuhiko Sugano, Zama, Japan
[73] Assignee: Nissan Motor Co., Ltd., Yokohama City, Japan
[21] Appl. No.: 538,278
[22] Filed: Oct. 3, 1983
[51] Int. Cl.$^4$ .................. F16H 45/02; F16H 5/64
[52] U.S. Cl. .................... 192/3.29; 192/3.31
[58] Field of Search ............ 192/3.31, 3.29, 3.3; 74/752 C

[56] References Cited

U.S. PATENT DOCUMENTS

| | | | |
|---|---|---|---|
| 3,977,502 | 8/1976 | Chana | 192/3.31 X |
| 3,985,046 | 10/1976 | Morris et al. | 192/3.31 X |
| 4,095,486 | 6/1978 | Ohnuma | 192/3.29 X |
| 4,270,636 | 6/1981 | Sunohara et al. | 192/3.31 |
| 4,294,140 | 10/1981 | Iwanaga et al. | 192/3.31 X |
| 4,305,487 | 12/1981 | Sunohara | 192/3.28 |
| 4,349,088 | 9/1982 | Ito et al. | 74/752 CX |
| 4,428,259 | 1/1984 | Kubo et al. | 192/3.31 X |
| 4,474,084 | 10/1984 | Sugano et al. | 74/869 |

FOREIGN PATENT DOCUMENTS

| | | |
|---|---|---|
| 51-11730 | 4/1976 | Japan . |
| 55-38539 | 10/1980 | Japan . |
| 121352 | 7/1983 | Japan .................. 192/3.29 |
| 121351 | 7/1983 | Japan .................. 192/3.29 |
| 1270890 | 4/1972 | United Kingdom . |

Primary Examiner—Rodney H. Bonck
Attorney, Agent, or Firm—Schwartz, Jeffery, Schwaab, Mack, Blumenthal & Evans

[57] ABSTRACT

A lock-up valve includes a spool movable between a clutch engagement position wherein the lock-up clutch is engaged and a clutch release position wherein the engagement of the lock-up clutch is released. A spring biases the spool toward the clutch release position. The spool has a first pressure acting area and a second pressure acting area. A fluid pressure is applied to the first pressure acting area during operation in one of the m th speed ratio and m+1 th speed ratio. An auxiliary valve is provided which allows the application of another fluid to the second pressure acting area during operation in the other speed ratio.

4 Claims, 5 Drawing Figures

4,607,731

HYDRAULIC CONTROL SYSTEM FOR AUTOMATIC TRANSMISSION HAVING TORQUE CONVERTER WITH LOCK-UP MECHANISM

CROSS-REFERENCES TO RELATED APPLICATIONS

References are made to the following related copending applications, each filed in the name of Kazuhiko Sugano: (1) U.S. patent application Ser. No. 494,647 (our ref.: U027-83) filed on May 16, 1983, and now U.S. Pat. No. 4,561,528; (2) U.S. patent application Ser. No. 507,228 (our ref.: U028-83) filed on June 23, 1983. References are also made to the following related copending applications, each filed in the name of Kazuhiko Sugano concurrently with the present application; (3) U.S. patent application Ser. No. 538,427 (our ref.: U068-83); (4) U.S. patent application Ser. No. 538,276 (our ref.: U070-83).

BACKGROUND OF THE INVENTION

The present invention relates to a hydraulic control system for an automatic transmission having a torque converter with a lock-up mechanism.

In the case of automatic transmissions having a torque converter with a lock-up mechanism, i.e., a mechanism to directly connect a pump impeller to a turbine runner, it is preferable to actuate the lock-up mechanism from a speed ratio as low as possible. Thus, in the case of an automatic transmission having three forward speed ratios and one reverse speed ratio, it is preferable to keep the lock-up mechanism actuated during operation in each of second and third forward speed ratios. However, if the transmission is shifted between the second and third speed ratios with the lock-up mechanism left actuated, substantial shocks will take place during shifting because torque variation takes place in the circumstance where an input shaft of the transmission is mechanically connected to a crankshaft of an engine. To avoid the shocks, an electronic control system has been needed which senses the commencement and completion of a shifting and generates electric signals for controlling the actuation of the lock-up mechanism. The electronic control system, however, requires a plurality of sensors and actuators, thus resulting in an enormous cost increase. If the same is to be carried out hydraulically, an extremely complicated hydraulic control system is necessary, thus failing to meet the demands for less cost and space saving.

SUMMARY OF THE INVENTION

According to the present invention, a hydraulic control system comprises a lock-up valve including a spool movable between a clutch engagement position and a clutch release position, and a spring biasing the spool toward the clutch release position. The spool has a first pressure acting area which is exposed to a fluid pressure which is present during operation in one of the m th speed ratio and m+1 th speed ratio. The spool has a second pressure acting area. Means is provided which applies another fluid pressure to the second pressure acting area during operation in the other speed ratio to urge the spool toward the clutch engagement position.

An object of the present invention is therefore to provide a simple hydraulic control system for engaging a lock-up clutch over a plurality of speed ratios and temporarily releasing the lock-up clutch during shifting between the speed ratios.

DETAILED DESCRIPTION OF THE INVENTION

Referring to FIGS. 1 to 4, the preferred embodiment according to the present invention is described.

Figure 1:
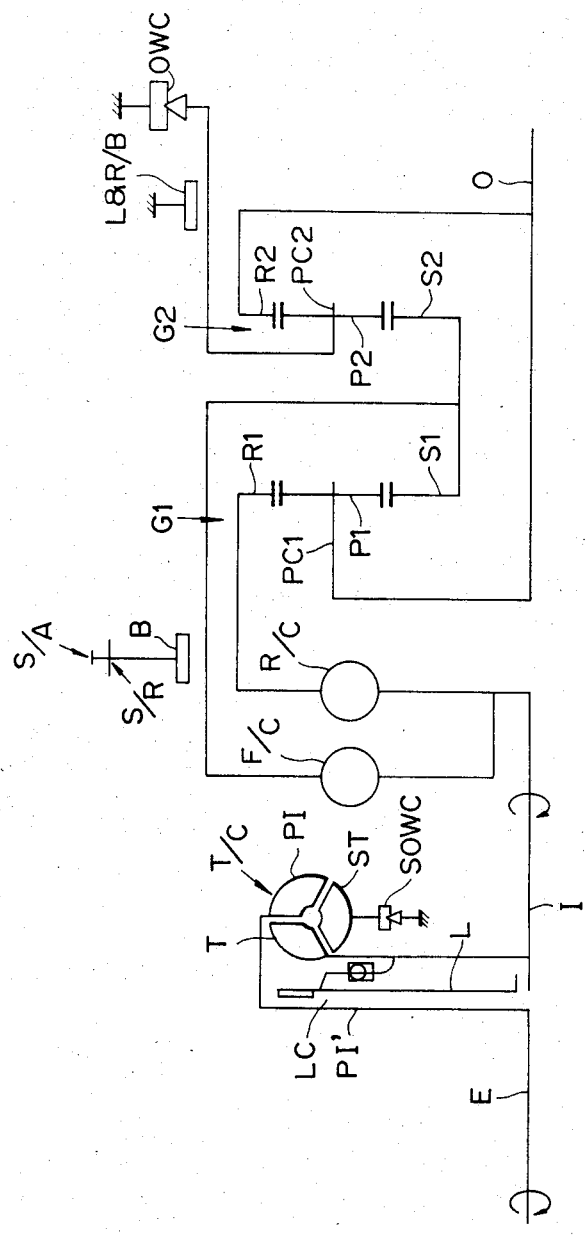
FIG. 1 is a schematic view of a power transmission mechanism of a three-speed automatic transmission.

Referring to FIG. 1, there is shown a schematic view of a power transmission mechanism of a three-speed automatic transmission having three forward speed ratios and one reverse speed ratio. This power transmission comprises an input shaft I to which rotary power is delivered from an engine output shaft E via a torque converter T/C, an output shaft O which transmits driving power to a final drive, a first planetary gear set G1, a second planetary gear set G2, a front clutch F/C, a rear clutch R/C, a band brake B, a low and reverse brake L&R/B, and one-way clutch OWC. The first planetary gear set G1 comprises an internal gear R1, a sun gear S1, and a carrier PC1 carrying pinion gears P1 meshing with the sun gear S1 and internal gear R1 simultaneously. The second planetary gear set G2 comprises an internal gear R2, a sun gear S2, and a carrier PC2 carrying pinion gears P2. The carrier PC1 is connected to an output shaft O, while the sun gear S1 is connectable with an input shaft I via the front clutch F/C, and the internal gear R1 is connectable to the input shaft I via the rear clutch R/C. The internal gear R2 is connected to the output shaft O, and the sun gear S2 is connected to the sun gear S1. The carrier PC2 is prevented from rotating in its reverse direction by the one-way clutch OWC. A low and reverse brake L&R/B is arranged to anchor the carrier PC2. The band brake B is arranged to anchor the sun gears S1 and S2. This band brake B is actuated by a servo having a servo-apply chamber S/A and a servo-release chamber S/R. When the fluid pressure is applied to the servo-apply chamber S/A, the band brake B is applied, while when the fluid pressure is applied to the servo-release chamber S/R, the band brake B is released irrespective of the presence of the fluid pressure in the servo apply chamber S/A. The torque converter T/C includes a pump impeller PI, a turbine runner T, a stator ST and a lock-up clutch L. The pump impeller PI is connected via a torque converter cover PI' to the engine output shaft E. The turbine runner T is connected to the input shaft I, and the stator ST is connected via a one-way clutch SWOC to a stationary portion of the transmission. The lock-up clutch L connected to the turbine runner T is axially movable and defines a lock-up clutch fluid pressure chamber LC in cooperation with the torque converter cover PI'. The lock-up clutch L is pressed against the torque converter cover PI' when fluid pressure in the lock-up clutch fluid pressure chamber LC is lower than that within the torque converter T/C and rotates integrally with the torque converter cover PI'. The detail construction of the lock-up clutch L is described in U.S. Pat. No. 4,305,487 issued Dec. 15, 1981 to Sunohara.

The front clutch F/C, rear clutch R/C, band brake B and low and reverse brake L&R/B (one-way clutch OWC) are engageable in the predetermined combinations shown by the following Table to provide three forward speed ratios and one reverse speed ratio.

TABLE

|  | F/C | R/C | L & R/B (OWC) | B | |
|---|---|---|---|---|---|
|  |  |  |  | S/A | S R |
| First speed |  | o | o |  |  |
| Second speed |  | o |  |  | o |
| speed |  |  |  | o |  |
| Third speed | o | o |  |  |  |
| speed |  |  |  | o | o |
| Reverse | o |  | o |  |  |
|  |  |  |  |  | o |

In the Table, the sign "o" indicates for each of clutches and brakes, the clutch or brake in question is engaged or applied. What is denoted by a label (OWC) below the brake L&R/B means that the first speed ratio is established by the one-way clutch OWC even if the brake L&R/B is not applied. However, in this first speed ratio, it is not possible for the output shaft O to drive the engine (that is, no engine braking is provided). What is indicated by the sign "o" in the column below B means that the servo apply chamber S/A and/or servo release chamber S/R in question are supplied with fluid pressure.

Figure 2:
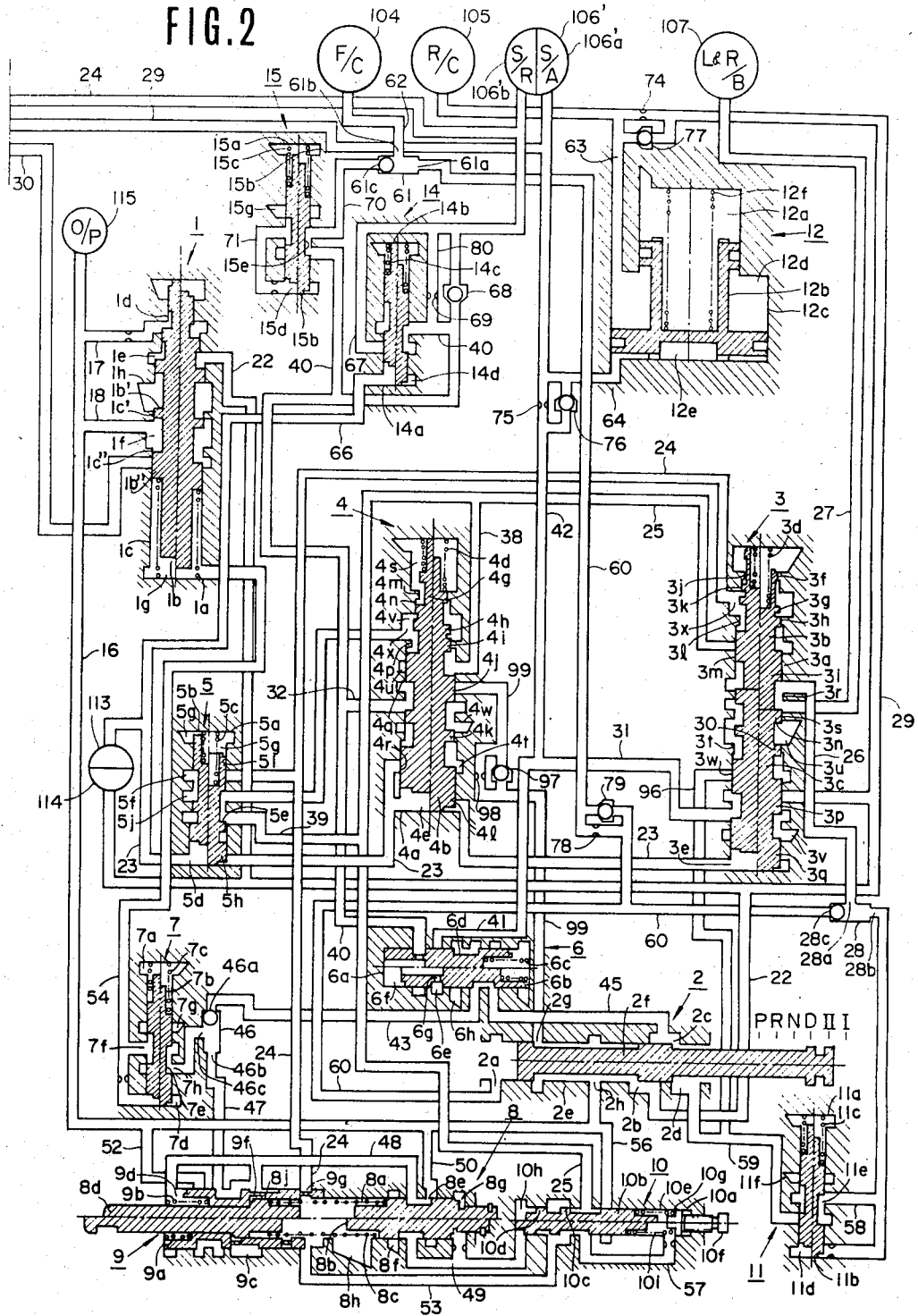
FIGS. 2 and 3, when combined, illustrate a circuit diagram of a hydraulic control system according to the present invention.
Figure 3:
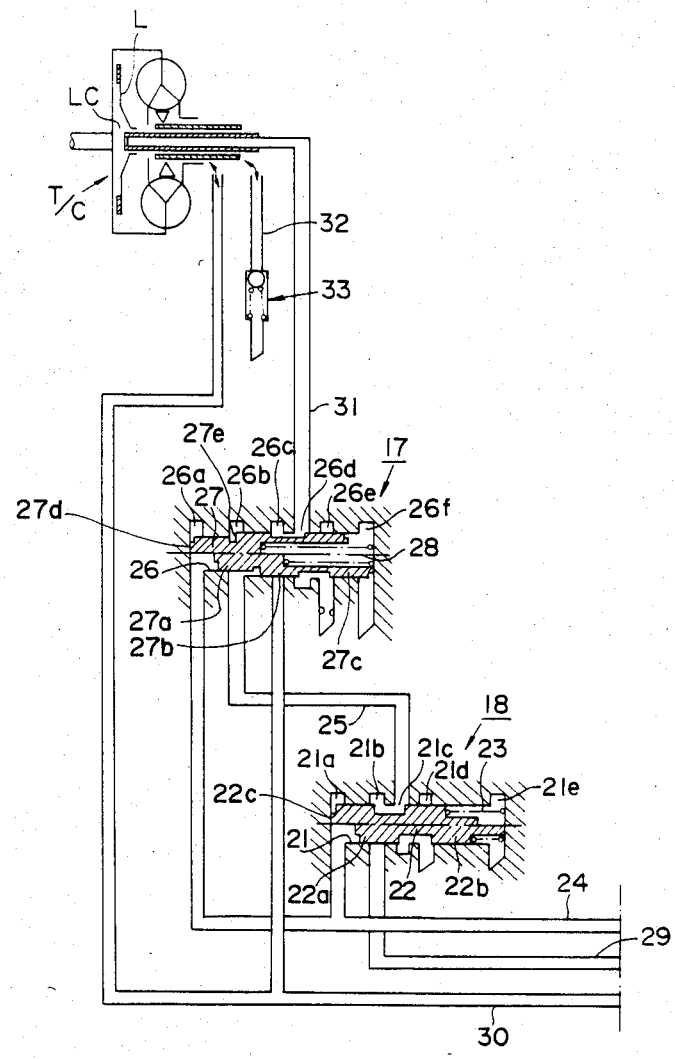

Referring to FIGS. 2 and 3, the hydraulic control system comprises a regulator valve 1, a manual valve 2, a 1-2 shift valve 3, a 2-3 shift valve 4, a 3-2 downshift valve 5, a line pressure booster valve 6, a pressure modifier valve 7, a throttle valve 8, a throttle fail-safe valve 9, a throttle modulator valve 10, a first manual range pressure reducing valve 11, an accumulator 12, a 3-2 timing valve 14, a front clutch pressure reducing valve 15, governor valves 113, 114, a lock-up valve 17, an auxiliary valve 18. As illustrated, these valves are connected with the torque converter T/C, lock-up clutch fluid chamber LC, front clutch F/C, rear clutch R/C, servo apply chamber S/A of the band brake B, servo release chamber S/R of the band brake B, low and reverse brake L&R/B, and oil pump O/P. The hydraulic control system is substantially the same as that of co-pending U.S. Pat. application Ser. No. 351,746 (our ref.: U169-81) filed Feb. 24, 1982 by Kazuhiko SUGANO et al., and now U.S. Pat. No. 4,474,084, (see FIG. 2) and commonly assigned herewith. The hydraulic control system according to the present invention is different from that described in U.S. Pat. application Ser. No. 351,746 in the provision of the lock-up valve 17 and auxiliary valve 18 for controlling the lock-up clutch L. More particularly, the lock-up valve 17 and auxiliary valve 18 are connected with a fluid conduit 29 which is pressurized when the hydraulic control system shown in FIG. 2 is conditioned for each of the second speed ratio and the third speed ratio and with another fluid conduit 24 which is pressurized when the hydraulic control system shown in FIG. 2 is conditioned for the third speed ratio.

The auxiliary valve 18 comprises a spool 22 axially slidable in a valve bore 21, and a spring 23 biasing the spool 22 to the left as viewed in FIG. 3. The valve bore 21 has ports 21a, 21b, 21c, 21d, and 21e. The spool 22 has lands 22a and 22b which have the same diameter. The spool 22 has a pressure acting area 22c formed on the lefthand end thereof. The port 21a communicates with the fluid conduit 24 connected with the servo release chamber S/R. The port 21b communicates with the fluid conduit 29 connected with the servo apply chamber S/A. The port 21c communicates via an oil conduit 25 with the port 26b of the lock-up valve 17. The ports 21d and 21e are drain ports, respectively.

The lock-up valve 17 comprises a spool 27 axially slidable in a valve bore 26, and a spring 28 biasing the spool 27 to the left as viewed in FIG. 3. The valve bore 26 has ports 26a, 26b, 26c, 26d, 26e, and 26f, while the spool 27 has lands 27a, 27b, and 27c. The lands 27b and 27c have the same diameter, and the land 27a has a smaller diameter than those of the former two. The spool 27 has a pressure acting area 27d formed on the lefthand end thereof as viewed in FIG. 3 and another pressure acting area 27e defined between the lands 27a and 27b. The port 26a communicates with the fluid conduit 24. The port 26b communicates with the port 21c of the auxiliary valve 18. The port 26c communicates with a fluid conduit 30 through which pressurized fluid is supplied from the regulator valve 1 to the torque converter T/C. The port 26d communicates via a fluid conduit 31 with the lock-up clutch fluid chamber LC. The ports 26e and 26f are drain ports, respectively. The fluid is supplied to the torque converter T/C from the fluid conduit 30 and discharged to the fluid conduit 32. The fluid in the fluid conduit 32 is drained via a pressure maintaining valve 33. The fluid pressure within the torque converter T/C, i.e., a torque converter supply fluid pressure, is determined by the pressure maintaining valve 33. The lock-up fluid chamber LC within the torque converter T/C communicates with the fluid conduit 31.

The operation is described.

In the first speed ratio, the 1-2 shift valve 3 is in the position as illustrated by right half thereof as viewed in FIG. 2, and no fluid pressure is supplied to the servo apply chamber S/A and servo release chamber S/R. Thus, no fluid pressure exists in the fluid conduits 24 and 29. Therefore, no fluid pressure is supplied to the ports 21a and 21b of the auxiliary valve 18 and the spool 22 is biased by the spring 23 to assume the position as illustrated by upper half thereof as viewed in FIG. 3. Since no fluid pressure is supplied via the fluid conduit 25 to the port 26b of the lock-up valve 17 and no fluid pressure is supplied to the port 26a thereof, the spool 27 is biased by the spring 28 to assume the position as illustrated by the upper half position thereof as viewed in FIG. 3. This allows the fluid conduit 30 to communicate with the fluid conduit 31, thus supplying the lock-up clutch fluid chamber LC with the same fluid pressure as that supplied to the torque converter chamber T/C. As a result, the lock-up clutch L is disengaged because the fluid pressure in the lock-up clutch fluid chamber LC becomes equal to that within the torque converter T/C.

As the vehicle speed increases, the 1-2 shift valve 3 switches from the position as illustrated by the right half thereof as viewed in FIG. 2 to the position as illustrated by left half thereof as viewed in FIG. 2, putting the transmission in the second speed ratio. This results in supply of fluid pressure to the servo apply chamber S/A, supplying the same fluid pressure to the fluid conduit 29. This fluid pressure is supplied via the ports 21b, 21c of the auxiliary valve 18, which is in the position as illustrated by the upper half thereof, the fluid conduit 25 to the port 26b, acting on the pressure acting area 27e, urging the spool 27 to move to the position as illustrated by the lower half thereof as viewed in FIG. 3. In this position of the spool 27, the port 26c communicating with the fluid conduit 30 is closed by the land 27b, while the port 26d communicating with the fluid conduit 31 is allowed to communicate with the drain port 26e. As a result, the lock-up clutch L is now engaged because the fluid within the lock-up clutch fluid chamber LC is discharged via the fluid conduit 31 and port 26d to the drain port 26e.

Figure 4:
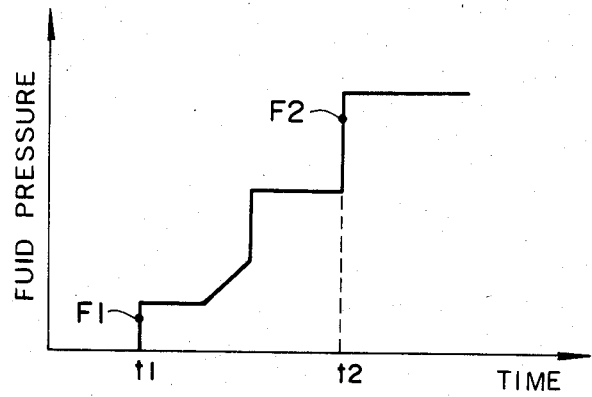
FIG. 4 is a graph how the fluid pressure within the servo release chamber S/A varies during shifting between two speed ratios.

When, subsequently, the spool of the 2-3 shift valve 4 switches from the position as illustrated by the right half thereof as viewed in FIG. 2 to the position as illustrated by the left half thereof as viewed in FIG. 2, the fluid pressure in the servo release chamber S/R starts increasing. The fluid pressure within the servo release chamber S/R increases as shown in FIG. 4. This fluid pressure is supplied via the fluid conduit 24 to the port 21a of the auxiliary valve 18, acting on the pressure acting area 22c and the port 26a of the lock-up valve 17, acting on the pressure acting area 27d. The spool 22 is urged to move to the right as viewed in FIG. 3. However, such rightward movement is resisted by the spring 23 which is set such that the spool 22 is prevented from switching from the position as illustrated by the upper half thereof as viewed in FIG. 3 to the position as illustrated by the lower half thereof as viewed in FIG. 3 until the fluid pressure within the fluid conduit 24 increases upto a value denoted by the reference character F1 in FIG. 4. When the spool 22 has switched to the position as illustrated by the lower half thereof as viewed in FIG. 3, the port 21b is closed by the land 22a and the port 21c is allowed to communicate with the drain port 21d, rendering the fluid pressure in the fluid conduit 25 to zero. Thus, the fluid pressure having acted via the port 26b of the lock-up valve 17 on the pressure acting area 27e disappears. Although the same fluid pressure as that within the servo release chamber S/R acts via the port 26a of the lock-up valve 17 on the pressure acting area 27d, this fluid pressure has not increased sufficiently high during the period from t1 to t2. Therefore, the spool 27 of the lock-up valve 17 is moved back to the position as illustrated by the upper half thereof as viewed in FIG. 3 by the spring 28. The force of the spring 28 is set such that the spool 27 is prevented from switching from the position illustrated by the upper half thereof as viewed in FIG. 3 to the position illustrated by the lower half thereof as viewed in FIG. 3 until a relatively high fluid pressure is supplied to the port 26a. If expressed in terms of fluid pressure, the spring force is the value denoted by the reference character F2 (see FIG. 4) which is slightly lower than the fluid pressure in its stable state. When the spool 27 has switched to the position as illustrated by the upper half thereof as viewed in FIG. 3, the engagement of the lock-up clutch L is released. Howeve, when fluid pressure exceeds the value denoted by the reference character F2 upon elapse of time t2, the spool 27 of the lock-up valve 17 assumes the position as illustrated by the lower half thereof as viewed in FIG. 3. As a result, the lock-up clutch L is engaged. That is, the fluid pressure acting via the port 26a on the pressure acting area 27d of the spool 27 is not high enough to hold the spool 27 in the position as illustrated by the lower half thereof as viewed in FIG. 3 during the period from t1 to t2. Thus, the lock-up valve 17 switches from the position illustrated by the lower half thereof as viewed in FIG. 3 to the position illustrated by the upper half thereof as viewed in FIG. 3, thus temporarily releasing the engagement of the lock-up clutch L. Therefore, the engagement of the lock-up clutch L is temporarily released during shifting from the second speed ratio to the third speed ratio, thus avoiding substantial shocks.

The engagement of the lock-up clutch L is released in a similar manner during shifting from the third speed ratio to the second speed ratio. When the 2-3 shift valve 4 switches from the third speed ratio position to the second speed ratio position, the fluid pressure in the servo release chamber S/R, i.e., the fluid pressure supplied to the port 26a of the lock-up valve 17 and to the port 21a of the auxiliary valve 18 starts decreasing. When this fluid pressure decreases slightly, the spool 27 of the lock-up valve 17 switches from the position as illustrated by the lower half thereof as viewed in FIG. 3 to the position as illustrated by the upper half thereof as viewed in FIG. 3. This allows the port 26c to communicate with the port 26d, thus releasing the engagement of the lock-up clutch L. However, since the fluid pressure in the servo release chamber S/R decreases during a short period of time and the fluid pressure in the port 21a also decreases accordingly, the spool 22 of the auxiliary valve 18 is moved to the position as illustrated by the upper half thereof as viewed in FIG. 3 by the action of the spring 23. This allows the port 21b to communicate with the port 21c, supplying the fluid pressure in the fluid conduit 29, i.e., the fluid pressure in the servo apply chamber S/A, via the fluid conduit 25, acting in the port 26b of the lock-up valve 17, switching the spool 29 to the position as illustrated by the lower half thereof as viewed in FIG. 3, resulting in reengagement of the lock-up clutch L. Therefore, the engagement of the lock-up clutch L is released during shifting from the third speed ratio to the second speed ratio, thus avoiding substantial shocks.

In the above-mentioned embodiment, the auxiliary valve 18 was necessary because the fluid pressure in the servo apply chamber S/A and that in the servo release chamber S/R which contribute to the shifting between the second speed ratio and the third speed ratio were used. But, the present invention may be applied to an automatic transmission which uses one fluid pressure that is present during operation in the m th speed ratio, but is absent during operation in the m+1 th speed ratio (where: m is an integer), and another fluid pressure which is absent during operation in the m th speed ratio, but is present during operation in the m+1 th speed ratio. In this case, the first fluid pressure is applied to the port 26b (or 26a), while the second fluid pressure is applied to the port 26a (or 26b). It will be noted that in the case of the previous embodiment the first fluid pressure corresponds to the fluid pressure in the fluid conduit 25, and the second fluid pressure corresponds to the fluid pressure in the fluid conduit 24. In the case of the previous embodiment shown in FIGS. 2 and 3, the auxiliary valve 18 was necessary for generating the first fluid pressure of the above mentioned characteristic, but such valve is not necessary if the first fluid pressure exists. Therefore, it will be understood that the auxiliary valve 18 should not be construed as an essential element of the present invention. In other words, in the previous embodiment, the auxiliary valve 18 was provided to generate the fluid pressure which meets the above mentioned requirements because the fluid pressure in the servo apply chamber S/A does not meet the above mentioned requirements, but such valve is not required in the case that an automatic transmission has a fluid pressure which meets the requirements for the first fluid pressure.

Figure 5:
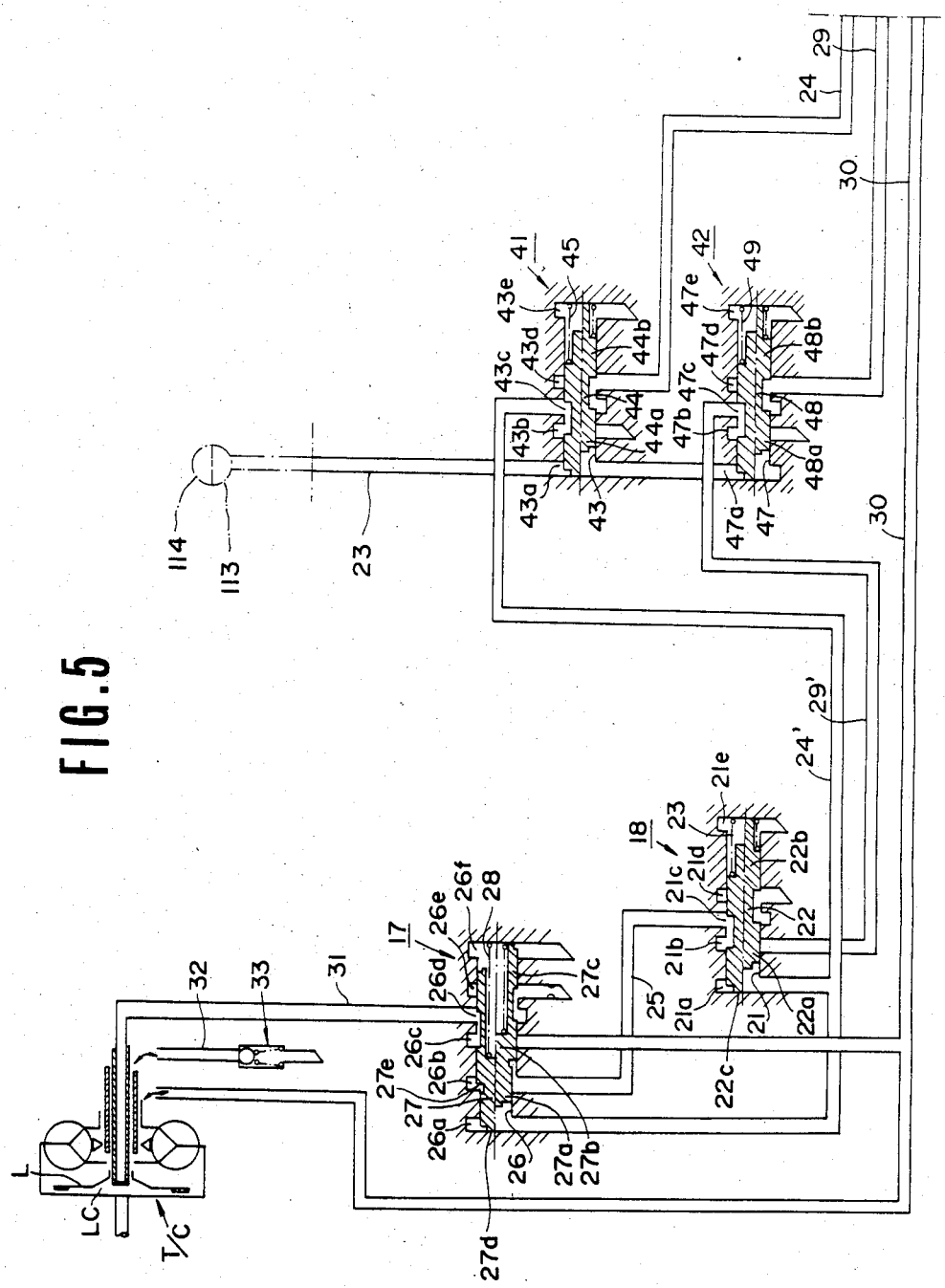
FIG. 5 is a similar view to FIG. 3 illustrating a second embodiment according to the present invention.

FIG. 5 illustrates a second embodiment according to the present invention. With the hydraulic control system shown in FIGS. 2 and 3, the lock-up clutch L was actuated in all of the forward speed ratios except the first speed ratio. Therefore, the lock-up clutch L may be engaged during operation at low revolution speeds of the engine depending upon the shift pattern selected. This causes the occurrence of vibration during operation at low engine revolution speeds if the transmission is coupled with an engine which may produce vibration at low revolution speeds. Therefore, there are occasions where the previous control is not practically acceptable. For avoiding the vibrations during operation at low engine revolution speeds due to the lock-up operation, the hydraulic control system shown in FIG. 5 is provided with a first speed cut valve 41 and a second speed cut valve 42 as fluidly disposed in a fluid conduit 24 and a fluid conduit 29, respectively, for the purpose of avoiding the engagement of the lock-up clutch during operation at low speeds. Since a lock-up valve 17 and an auxiliary valve 18 used in this embodiment are similar to the counterparts in FIG. 3, the same reference numerals are used and description thereof is omitted.

The first speed cut valve 41 comprises a spool 44 axially slidable in a valve bore 43, and a spring 45 biasing the spool 44 to the left as viewed in FIG. 5. The valve bore 43 has five ports 43a to 43e. The ports 43b and 43e are drain ports, respectively. The port 43a is supplied with a governor pressure from a governor pressure conduit 23. The port 43c is connected via a fluid conduit 24' with a port 26a of the lock-up valve 17 and a port 21a of the auxiliary valve 18. The port 43d is connected via a fluid conduit 24 with a servo release chamber S/R. The spool 44 has two lands 44a and 44b which have the same diameter. The lands 44a and 44b function to connect the port 43c with the port 43b or with the port 43d depending upon the position of the spool 44. The governor pressure in the port 43a acts on the lefthand end, as viewed in FIG. 5, of the land 44a.

The second speed cut valve 42 is similarly constructed to the first speed cut valve 41. It comprises a spool 48 axially slidable in a valve bore 47, and a spring 49 biasing the spool 48 to the left as viewed in FIG. 5. The valve bore 47 has five ports 47a to 47e. The ports 47b and 47e are drain ports, respectively. The port 47a is connected with the above mentioned governor pressure fluid conduit 23. The port 47c is connected via a fluid conduit 29' with a port 21b of the auxiliary valve 18. The port 47d is connected via a fluid conduit 29 with a servo apply chamber S/A. The spool 48 has two lands 48a and 48b of the same diameter. The lands 48a and 48b function to connect the port 47c with the port 47b or the port 47d depending upon the position of the spool 48. The governor pressure in the port 47a acts on the lefthand end of the land 48a as viewed in FIG. 5.

Hereinafter, the operation of this second embodiment is described.

When the vehicle speed is high and accordingly the governor pressure is high, the first and second speed cut valves 41 and 42 assume states as illustrated by lower halves thereof as viewed in FIG. 5 wherein the fluid conduits 24 and 24' communicate with each other and the fluid conduits 29 and 29' communicate with each other. Under this condition, the distribution of the fluid pressure is quite the same as in the first embodiment previously described. Thus, the lock-up valve 17 and the auxiliary valve 18 operate in the same manner as in the first embodiment. However, when the governor pressure drops low enough to cause the first and second speed cut valves 41 and 42 to assume upper halves thereof as viewed in FIG. 5, the fluid pressures in the fluid conduits 24' and 29' are discharged to the drain ports 43b and 47b, respectively. Thus, the lock-up valve 17 and the auxiliary valve 18 assume upper halves thereof as viewed in FIG. 5 and the lock-up clutch L is disengaged. The setting of the spring 45 is such that the spool 44 of the first speed cut valve 41 switches from the position as illustrated by lower half thereof as viewed in FIG. 5 to the position as illustrated by the upper half thereof as illustrated by the upper half thereof as viewed in FIG. 5 when the governor pressure is lower than a first predetermined value. The setting of the spring 49 is such that the spool 48 switches from the position as illustrated by the lower half thereof as viewed in FIG. 5 to the position as illustrated by the upper half thereof as viewed in FIG. 5 when the governor pressure is lower than a second predetermined value. Thus, during operation in the third speed ratio, the engagement of the lock-up clutch L is released at a vehicle speed determined by the first speed cut valve 41, and during operation in the second speed ratio, the engagement of the lock-up clutch L is relesed at a vehicle speed determined by the second speed cut valve 42. Preferably, the second predetermined value is lower than the first predetermined value. Since the provision of the speed cut valves 41 and 42 permits the lock-up clutch to be disengaged before the engine start vibrating, the efficient operation with the lock-up clutch is provided.

I claim:

1. In a hydraulic control system for an automatic transmission for a vehicle having a torque converter with a lock-up clutch, the automatic transmission having a plurality of forward speed ratios including a m th speed ratio and a m+1 th speed ratio, where m is an integer, the hydraulic control system having a first portion wherein a fluid pressure is present during operation in one of the m th speed ratio and the m+1 th speed ratio and absent during operation in the other speed ratio, and a second portion wherein a fluid pressure is present during operation in each of the m th speed ratio and the m+1 th speed ratio;

a lock-up valve including a bore having a first signal pressure port and a second signal pressure port, and a spool movable within said bore between a clutch engagement position wherein the lock-up clutch is engaged and a clutch release position wherein the engagement of the lock-up clutch is released, and a spring biasing said spool toward the clutch release position, said first signal pressure port being connected to the first portion of the hydraulic control system;

said spool of said lock-up valve having a first pressure acting area which communicates with said first signal pressure port so as to be exposed to the fluid pressure in the first portion of the hydraulic control system and being urged against said spring toward the clutch engagement position, said spool having a second pressure acting area which communicates with said second signal pressure port; and auxiliary means responsive to the fluid pressure at said first signal pressure port of said bore of said lock-up valve for normally connecting said second signal pressure port to the second portion of the hydraulic control system, but draining said second signal pressure port when the fluid pressure at said first signal pressure port of said bore of said lock-up valve is higher than a first predetermined value;

said spring of said lock-up valve being set such that said spool of said lock-up valve assumes the clutch engagement position when the fluid pressure at said first signal pressure port of said lock-up valve is higher than a second predetermined value that is higher than said first predetermined value.

2. A hydraulic control system as claimed in claim 1, wherein said auxiliary means comprises an auxiliary valve including a bore having a signal pressure port connected to said first signal pressure port of said bore of said lock-up control valve, an outlet port connected with said second signal pressure port of said bore of said lock-up control valve, and an inlet port connected to the second portion of the hydraulic control system, and a drain port;

said auxiliary valve including a spool movable within said bore thereof between a first position wherein said outlet port thereof communicates with said drain port only and a second position wherein said outlet port communicates with said inlet port thereof only, and a spring biasing said spool thereof toward said second position thereof, said spool of said auxiliary valve having a pressure acting area communicating with said signal pressure port of said bore of said auxiliary valve so as to be exposed to the fluid pressure in the first portion of the hydraulic control system.

3. In a hydraulic control system for an automatic transmission for a vehicle having a torque converter with a lock-up clutch, the automatic transmission having a plurality of forward speed ratios including a m th speed ratio and a m+1 th speed ratio, where m is an integer, the hydraulic control system having a first portion wherein a fluid pressure is present during operation in one of the m th speed ratio and the m+1 th speed ratio and absent during operation in the other speed ratio, and a second portion wherein a fluid pressure is present during operation in each of the m th speed ratio and the m+1 th speed ratio, the hydraulic control system including means for generating a governor fluid pressure indicative of a vehicle speed of the vehicle:

a lock-up valve including a bore having a first signal pressure port and a second signal pressure port, and a spool movable within said bore between a clutch engagement position wherein the lock-up clutch is engaged and a clutch release position wherein the engagement of the lock-up clutch is released, and a spring biasing said spool toward the clutch release position, said first signal pressure port being connected to the first portion of the hydraulic control system, said second signal pressure port being connected to the second portion of the hydraulic control system;

said spool of said lock-up valve having a first pressure acting area which communicates with said first signal pressure port, and a second pressure acting area which communicates with said second signal pressure port;

first means responsive to the governor fluid pressure for disconnecting said first signal pressure port from the first portion of the hydraulic control system and draining said first signal pressure port; and second means responsive to the fluid pressure at said first signal pressure port of said bore of said lock-up valve and the governor fluid pressure for disconnecting said second signal pressure port of said bore of said lock-up valve from the second portion of the hydraulic control system and draining said second signal pressure port;

said second means including auxiliary means for draining said second signal pressure port when the fluid pressure at said first signal pressure port of said lock-up valve is higher than a first predetermined value;

said spring of said lock-up valve being set such that said spool of said lock-up valve assumes the clutch engagement position when the fluid pressure at said first signal pressure port of said lock-up valve is higher than a second predetermined value that is higher than said first predetermined value.

4. A hydraulic control system as claimed in claim 3, wherein said auxiliary means comprises an auxiliary valve including a bore having a signal pressure port, an outlet port connected with said second signal pressure port of said bore of said lock-up control valve, an inlet port, and a drain port;

said auxiliary valve including a spool movable within said bore thereof between a first position wherein said outlet port thereof communicates with said drain port only and a second position wherein said outlet port communicates with said inlet port thereof only, and a spring biasing said spool thereof toward said second position thereof, said spool of said auxiliary valve having a pressure acting area communicating with said signal pressure port of said bore of said auxiliary valve; and said first means includes first speed cut valve means responsive to the governor fluid pressure for normally connecting said first signal pressure port of said bore of said lock-up control valve and said signal pressure port of said bore of said auxiliary valve to the first portion of the hydraulic control system, but draining said first signal pressure port of said bore of said lock-up control valve and said signal pressure port of said bore of said auxiliary valve when the governor pressure is lower than a first predetermined value; and said second means includes second speed cut valve means responsive to the governor pressure for normally connecting said inlet port of said auxiliary control valve to the second portion of the hydraulic control system, but draining said inlet port of said auxiliary valve when the governor pressure is lower than a second predetermined value that is lower than said first predetermined value.

* * * * *